INVENTORS
R. E. WIGHTMAN
K. V. KRATOCHVIL
BY Hudson & Young
ATTORNEYS

United States Patent Office 2,991,646
Patented July 11, 1961

2,991,646
SAMPLING SYSTEM FOR A PROCESS ANALYZER
Robert E. Wightman and Kenneth V. Kratochvil, Bartlesville, Okla., assignors to Phillips Petroleum Company, a corporation of Delaware
Filed Sept. 20, 1956, Ser. No. 611,059
4 Claims. (Cl. 73—23)

This invention relates to the preparation of liquid and vapor streams removed from a chemical process for subsequent analysis by the removal of solid and slurry materials.

In order to provide continuous sample streams for process monitors and control instruments, such as mass spectrometers, infrared analyzers, refractometer, or other optical instructments, it is generally necessary to remove solid and slurry materials which may be present in the stream. This cannot always be accomplished by standard filtering methods because large amounts of solid or slurry materials build up and cause rapid plugging of conventional filters. Furthermore, fine particle size materials cannot always be filtered out of fluid streams. Examples of streams which contain solid or slurry materials include alkylation process streams which carry aluminum chloride sludge, phosphoric acid streams found in the manufacture of triple superphosphate which carry calcium sulfate sludge, and catalytic cracking effluent streams which carry catalyst dust. Generally speaking, the amount of sample required for continuous process monitor and control instruments is quite small in comparison with the volume of sample stream available for analysis.

In accordance with the present invention, it has been discovered that solid and slurry materials can advantageously be separated from liquid and vapor streams by the use of a cyclone separator. A relatively large volume of the sample stream is directed into the cyclone separator which is operated so that a large portion of the inlet stream is removed through the bottom of the separator. The solid materials are centrifugally separated and removed through the bottom outlet along with the main body of the sample stream. A relatively small volume stream that is free from solids is withdrawn from the top of the separator. In normal operation, approximately 90 to 98 percent of the inlet stream is removed from the bottom of the separator. This effects extremely good separation because of the centrifugal forces developed. Since most analyzers require a sample in the vapor phase, the sample stream withdrawn from the top of the separator is vaporized, if it is not already a vapor, and is directed to the analyzer.

Accordingly, it is an object of this invention to provide an improved system for supplying sample streams to analysis instruments.

Another object is to provide a sample stream preparation system which incorporates a cyclone separator to remove solid and slurry materials from a fluid sample stream to be analyzed.

A further object is to provide improved analysis procedures.

Other objects, advantages, and features of this invention should become apparent from the following detailed description which is taken in conjunction with the accompanying drawing in which.

Figure 1:
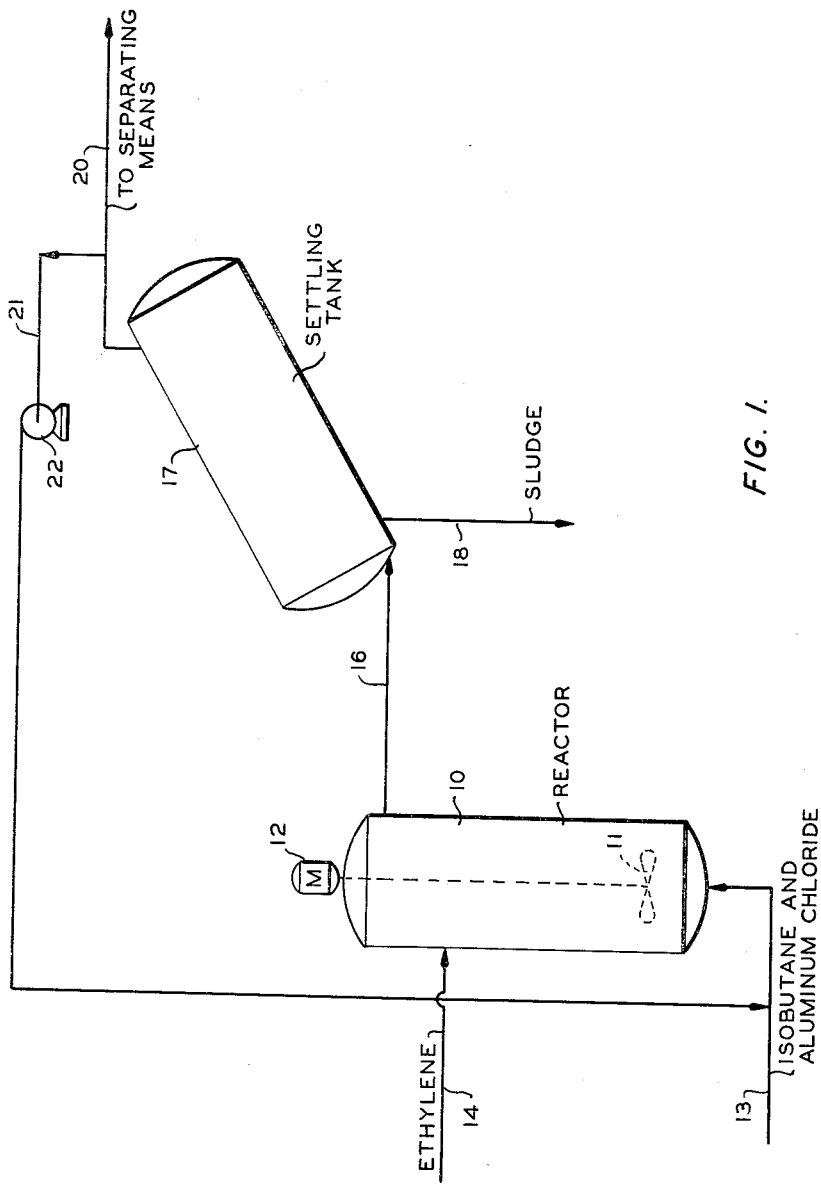
FIGURE 1 is a schematic representation of an alkylation unit to which the sampling system of this invention is particularly applicable.

Referring now to the drawing in detail and to FIGURE 1 in particular, there is shown a reactor 10 for an alkylation process. This reactor is provided with a stirrer 11 which is rotated by a motor 12. A first feed stream, which can be a mixture of isobutane and aluminum chloride catalyst, is supplied to the bottom of reactor 10 by means of a conduit 13. A second feed stream, which can be ethylene, is supplied to reactor 10 through a conduit 14. The reaction product is removed from reactor 10 through a conduit 16 which communicates with a settling tank 17. Sludge is withdrawn from bottom of tank 17 through a conduit 18 and can be recycled back to reactor 10, if desired. An overhead stream, containing the alkylate product and unreacted isobutane, is withdrawn from tank 17 through a conduit 20 which communicates with suitable separating means, not shown. A portion of the overhead stream from settling tank 17 is recycled back to reactor 10 through a conduit 21 which has a pump 22 therein. It is desired to analyze a sample of this stream to determine the completeness of the reaction. This can readily be done by measuring the ethylene concentration in the stream directed through conduit 21. Such an analysis can be made by means of an infrared analyzer, for example.

Figure 2:
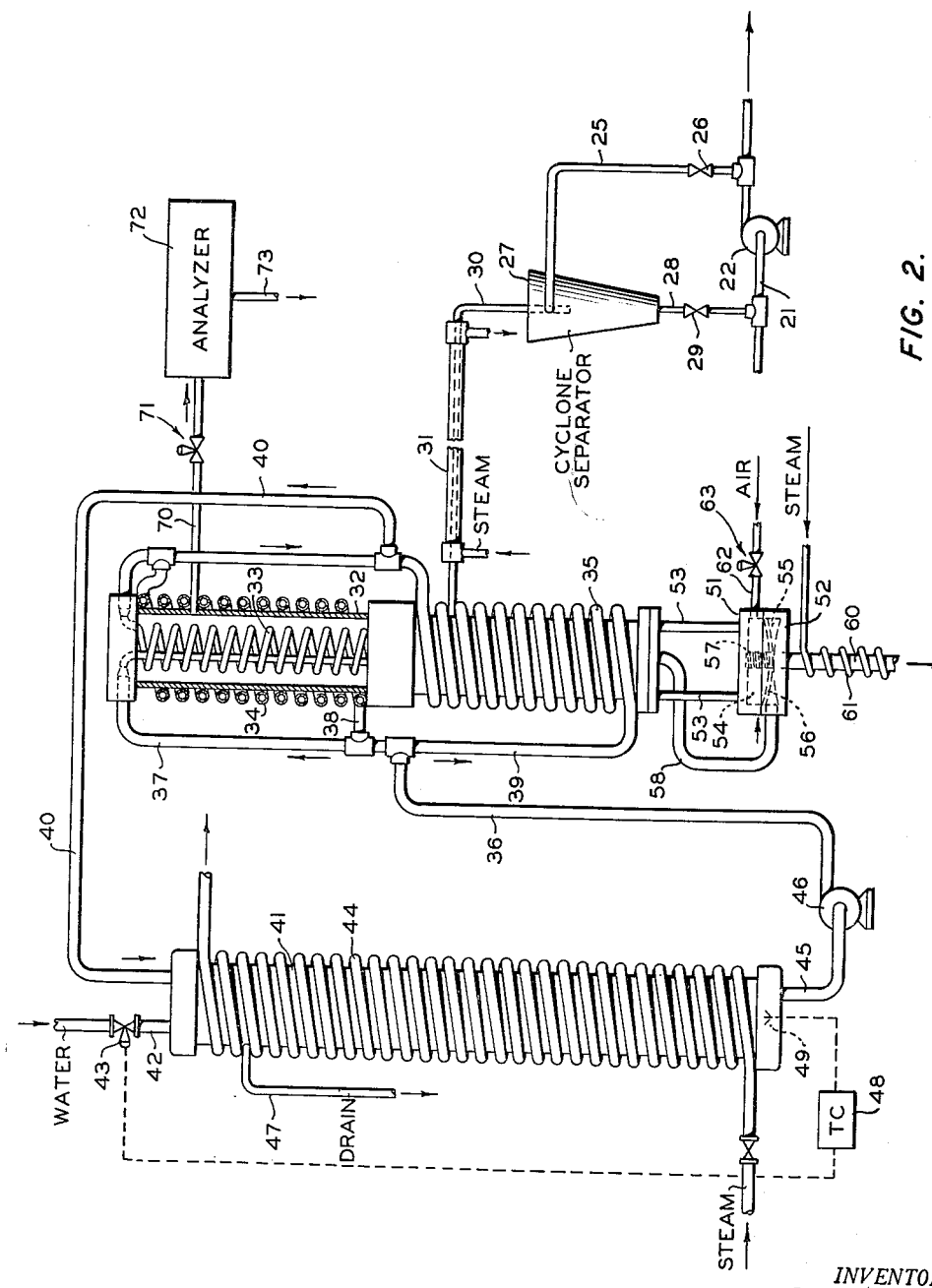
FIGURE 2 is a schematic view of a present preferred embodiment of the sampling system of this invention.

The stream circulated through conduit 21 normally contains some aluminum chloride sludge which must be removed before the stream is passed to the analyzer. A present preferred embodiment of the sample stream preparation system of this invention is illustrated schematically in FIGURE 2. A conduit 25, which has a valve 26 therein, communicates between conduit 21 downstream from pump 22 and the inlet of a cyclone separator 27. The bottom opening of separator 27 is connected by means of a conduit 28, which has a valve 29 therein, with conduit 21 upstream from pump 22. The pressure differential across pump 22 thus results in a flow of fluid through conduit 25, separator 27, and conduit 28. Cyclone separators are well known in the art and for this reason separator 27 is not described in detail herein. Separator 27 includes an inlet port in the upper side wall which introduces the inlet stream tangential to the inner wall. The resulting centrifugal force serves to separate entrained solids which fall to the bottom of the separator and are removed through conduit 28. A solid-free stream is removed from the top of separator 27 through a conduit 30, the lower end of which extends down into separator 27 to a point below the fluid inlet port. The relative sizes of conduits 28 and 30 are selected so that approximately 90 to 98 percent of the fluid introduced into separator 27 is removed through bottom conduit 28. This results in a sample stream substantially free of solids being removed through conduit 30. Substantially all of the aluminum chloride sludge present in the sample circulated through conduit 21 is removed by means of separator 27 so that the stream removed through conduit 30 is free of this sludge.

Conduit 30 communicates at its second end with a flash chamber which comprises an upright conduit 32. Conduit 30 is provided with a jacket 31 through which steam is circulated to prevent condensation in the line and to retain in solution any aluminum chloride sludge which may still be present. The temperature within the flash chamber is maintained at a constant predetermined value by circulating water at a constant temperature through an internal coil 33 and a pair of external coils 34 and 35. This water is supplied by a conduit 36 which terminates in branch conduits 37, 38 and 39 that communicate with the inlets of coils 33, 34 and 35, respectively. The outlets of these three coils are connected to a common conduit 40 which communicates with the top of a mixing chamber 41. Cool water is supplied to the top of chamber 41 by a conduit 42 which has a control valve 43 therein. The water in chamber 41 is heated by means of a coil 44 which surrounds the chamber and which has steam circulated therethrough. A conduit 45 communicates between the bottom of chamber 41 and the inlet of a pump 46. Conduit 36 communicates with the outlet of pump 46. Chamber 41 is provided with an overflow drain conduit 47. A temperature sensing element 49 is disposed in the bottom of chamber 41. This element actuates a temperature controller 48 which adjusts the opening of valve 43. In this manner, the flow of cool water into chamber 41 is regulated so that the water removed from the bottom of the chamber is maintained at a constant temperature. This insures that flash chamber 32 is also operated at a constant temperature.

A constant pressure is maintained in flash chamber 32 by means of a back pressure regulator which comprises first and second plates 51 and 52 that are mounted adjacent one another beneath chamber 32 by means of bolts 53. Plates 51 and 52 are provided with cavities which define chambers 54 and 55, respectively, which are separated from one another by a diaphragm 56. A drain conduit 60 communicates with chamber 55. Diaphragm 56 normally blocks drain conduit 60 and is held in this position by a spring 57. A conduit 58 communicates between the interior of flash chamber 32 and chamber 55. Air at a constant pressure, which is maintained by a regulator 63, is supplied to chamber 54 to assist spring 57 in retaining diaphragm 56 across the opening defined by conduit 60. If the pressure within flash chamber 32 exceeds the combined forces of spring 57 and the air pressure in chamber 54, diaphragm 56 is moved away from conduit 60 so that fluid is removed from chamber 32 through conduit 60. In normal operation, there is a constant flow through conduit 60 to compensate for the sample which enters the chamber continuously. A coil 61 surrounds conduit 60. Steam is circulated through this coil to prevent condensation therein.

The fluid sample normally enters flash chamber 32 at a higher temperature than the temperature within the chamber. This preheating of the sample stream by steam jacket 31 precludes the possibility of the chamber being upset by vaporizing a cold sample therein. The ratio of liquid to vapor in chamber 32 is maintained relatively small. A small vapor sample is removed from the top of chamber 32 through a conduit 70 which communicates with the inlet of an analyzer 72. This sample stream is vented from analyzer 72 through a vent 73. A pressure controller 71 is disposed in conduit 70. All of the liquid and the remaining vapor in chamber 32 are removed from the bottom of the chamber through the back pressure regulator. The aluminum chloride sludge and most of the heavier hydrocarbons do not vaporize appreciably at the temperature and pressure within the chamber. Most of the ethylene does vaporize, however, so that a change in ethylene content in the original sample is reflected by a proportional change in the ethylene content of the final sample stream which is removed from chamber 32 through conduit 70.

In one specific embodiment of this invention, the pressure downstream from pump 22 was maintained at approximately 400 pounds per square inch gage. The pressure at the inlet of pump 22 was maintained at approximately 370 pounds per square inch gage. The temperature of the stream directed through pump 22 was in the general range of 120 to 140° F. This stream had a composition approximately as follows:

| Component: | Mol percent |
|---|---|
| Methane | 1.66 |
| Ethylene | 0.94 |
| Ethane | 5.18 |
| Propane | 2.69 |
| Isobutane | 62.30 |
| Normal butane | 4.15 |
| Pentane and heavier | 23.08 |

Aluminum chloride was present in a concentration of approximately 680 parts per million. Conduits 25 and 28 had internal diameter of approximately ¼ inch. Conduit 30 comprised approximately 8 feet of 1/32 inch internal diameter pipe in series with approximately 48 feet of 1/16 inch internal diameter pipe between separator 27 and conduit 32. These small diameter pipes provided the desired pressure drop and avoided plugging in the line. Steam jacket 31 comprised ¼ inch internal diameter pipe. Conduit 21 was an eight inch line. Flash chamber 32 was operated at a temperature of approximately 100° F. and at a pressure of approximately 30 pounds per square inch gage. The sample supplied to analyzer 72 through conduit 70 was maintained at a pressure of approximately 7 pounds per square inch gage by means of controller 71 in order to prevent condensate from forming in this line. The sample flow to analyzer 72 was at a rate of 1000 to 1500 cc. per minute.

An infrared analyzer can be employed to advantage to measure the ethylene concentration in the sample stream. Such analyzers are well known in the art and for this reason analyzer 72 is not described in detail herein. However, the analyzer can be any other suitable instrument which is capable of measuring the concentration of ethylene. A mass spectrometer can be employed to make this measurement, for example.

The important feature of this invention resides in the incorporation of a cyclone separator in the sample line. This separator permits the passage of a relatively large sample stream therethrough in order to provide a small, extremely clean sample stream. This separator offers a decided advantage over the conventional filtering systems employed heretofore because it can be operated continuously and is not subjected to plugging. This permits continuous operation and restores all of the removed solids and slurry material back to the process line, which can be an advantage in some applications. More than one cyclone separator can be employed in series to provide an even greater removal of solid materials.

While this invention has been described in conjunction with a present preferred embodiment, it should be evident that it is not limited thereto.

What is claimed is:

1. Apparatus for preparing fluid sample streams for analysis comprising a cyclone separator, a flash chamber, first conduit means communicating with the inlet of said separator to supply a sample stream, second conduit means communicating between the upper outlet of said separator and said flash chamber, said second conduit means having an internal cross-sectional area substantially smaller than the internal cross-sectional area of said first conduit means, means to heat said second conduit means, means to maintain said flash chamber at a predetermined temperature, means to maintain a predetermined pressure in said flash chamber, and third conduit means communicating with said flash chamber to remove a vapor sample.

2. Apparatus for obtaining a sample stream for analysis comprising first conduit means for passing the material to be analyzed, a pump in said first conduit means, a cyclone separator, second conduit means communicating between said first conduit means downstream from said pump and the inlet of said separator, third conduit means communicating between the lower outlet of said separator and said first conduit means upstream from said pump, a flash chamber, fourth conduit means communicating between the upper outlet of said separator and said flash chamber, the internal cross-sectional area of said fourth conduit means being substantially smaller than the internal cross-sectional area of said second and third conduit means, and fifth conduit means communicating with said flash chamber to remove a vapor sample.

3. Apparatus for obtaining a sample stream for analysis comprising first conduit means for passing the material to be analyzed, a pump in said first conduit means, a cyclone separator, second conduit means communicating between said first conduit means downstream from said pump and the inlet of said separator, third conduit means communicating between the lower outlet of said separator and said first conduit means upstream from said pump, a flash chamber, fourth conduit means communicating between the upper outlet of said separator and said flash chamber, the internal cross-sectional area of said fourth conduit means being substantially smaller than the internal cross-sectional areas of said second and third conduit means, means to heat said fourth conduit means, means to maintain said flash chamber at a predetermined temperature, means to maintain a predetermined pressure in said flash chamber, and fifth conduit means communicating with said flash chamber to remove a vapor sample.

4. Analysis apparatus comprising first conduit means for passing a fluid to be analyzed, an analyzer, a pump in said first conduit means, a cyclone separator, second conduit means communicating between said first conduit means downstream from said pump and the inlet of said separator, third conduit means communicating between the lower outlet of said separator and said first conduit means upstream from said pump, and fourth conduit means communicating between the upper outlet of said separator and said analyzer, the internal cross-sectional area of said fourth conduit means being substantially smaller than the internal cross-sectional areas of said second and third conduit means.

References Cited in the file of this patent

UNITED STATES PATENTS

| | | | |
|---|---|---|---|
| 2,356,845 | Hines | | Aug. 29, 1944 |
| 2,370,817 | Shanley | | Mar. 6, 1945 |
| 2,408,964 | Winn et al. | | Oct. 8, 1946 |
| 2,648,433 | Wright et al. | | Aug. 11, 1953 |
| 2,717,536 | Clark et al. | | Sept. 13, 1955 |
| 2,719,425 | Kalle | | Oct. 4, 1955 |
| 2,767,319 | Beeton et al. | | Oct. 16, 1956 |
| 2,776,053 | Krebs | | Jan. 1, 1957 |
| 2,785,055 | Redcay | | Mar. 12, 1957 |
| 2,794,832 | Rietema | | June 4, 1957 |

FOREIGN PATENTS

| | | | |
|---|---|---|---|
| 1,066,740 | France | | Jan. 20, 1954 |
| 1,110,045 | France | | Oct. 5, 1955 |
| 515,053 | Canada | | July 26, 1955 |